United States Patent [19]

Kaspar et al.

[11] Patent Number: 4,721,354
[45] Date of Patent: Jan. 26, 1988

[54] DEVICE FOR POSITIONING AN OPTICAL FIBRE

[75] Inventors: Herbert H. Kaspar; Manfred T. L. Lennartz, both of Aachen; Heinrich A. Oepen, Stolberg; Hermann J. H. Wehr, Aachen, all of Fed. Rep. of Germany

[73] Assignee: U.S. Philips Corporation, New York, N.Y.

[21] Appl. No.: 814,932

[22] Filed: Dec. 30, 1985

[30] Foreign Application Priority Data

Jan. 8, 1985 [DE] Fed. Rep. of Germany ....... 3500356

[51] Int. Cl.⁴ .................................................. G02B 6/36
[52] U.S. Cl. ................................. 350/96.20; 350/96.21; 350/96.10
[58] Field of Search ................ 350/96.10, 96.15, 96.20; 250/578

[56] References Cited

U.S. PATENT DOCUMENTS

| 4,212,513 | 7/1980 | Gravel | 350/96.15 |
| 4,303,302 | 12/1981 | Ramsey et al. | 350/96.15 X |
| 4,474,423 | 10/1984 | Bisbee et al. | 350/96.20 X |
| 4,543,663 | 9/1985 | Laor | 350/96.15 X |
| 4,615,097 | 10/1986 | Genequand | 350/96.20 X |

FOREIGN PATENT DOCUMENTS 0160113  9/1984  Japan ............................... 350/96.20

Primary Examiner—William L. Sikes
Assistant Examiner—Akm E. Ullah
Attorney, Agent, or Firm—Marc D. Schechter

[57] ABSTRACT

A device for positioning an optical fiber with respect to a defined reference plane. The optical fiber is arranged so as to be displaceable with respect to the reference plane by an electro-mechanical deflector device comprising three pairs of deflector elements which are arranged like parallel leaf springs.

15 Claims, 4 Drawing Figures

DEVICE FOR POSITIONING AN OPTICAL FIBRE

BACKGROUND OF THE INVENTION

The invention relates to a device for positioning an optical fiber with respect to a defined reference plane. The optical fiber is arranged so as to be displaceable with respect to the reference plane by means of an electromechanical deflector device.

A reference plane may be formed, for example, by a second optical fiber, a light source or a light receiver. Adjustable positioning of, for example, the end faces of optical fibers with respect to one another is important for numerous measuring-technical applications.

For example, the amount of light carried by optical fibers can be varied in a controlled manner by offsetting the end faces of two facing optical fibers in the axial direction (the so-called variable coupling method). The precision of the adjusting member and the offset are critical variables in the sub-micron range. Furthermore, variable coupling requires fibers with smooth and higher parallel end faces. These requirements become more severe as the refractive index difference between the fibers and the medium between the fiber end faces increases.

In all applications the efficiency of use of optical fibers depends on whether the end faces of the optical fibers can be accurately positioned in a reproducible manner. For example, mechanical devices such as x-y-z translators, concentric tubes of V-groove devices are known to be used for this purpose. Such mechanical positioning devices have drawbacks such as, for example, play between the components of the device, hysteresis effects, comparatively high manufacturing costs and in many cases also insufficient reliability.

German Offenlegungsschrift No. 3103010 (corresponding to U.S. Pat. No. 4,543,663) discloses a device for positioning the end of an optical fiber within a range of positions. This device comprises a deflector device which includes at least one piezoelectric deflector element. A first end of the deflector element is arranged for connection to one or more ends of one or more optical fibers. A second end of the deflector element is situated at reference position. When a suitable amount of electric energy is applied to the piezoelectric deflector element, it assumes a given position from the range of positions. The device does not allow for relative displacement of the end faces of two optical fibers without causing a change of the tilting angle between the end faces, so that angular errors occur in this known device.

SUMMARY OF THE INVENTION

It is an object of the invention to provide a device for positioning an optical fiber with respect to a reference plane which allows for a continuous relative displacement of the end face of the optical fiber in three mutually perpendicular directions (x, y, z) without giving rise to angular errors.

According to the invention, the deflector device comprises three pairs of electromechanical deflector elements. Each pair is arranged like a pair of parallel leaf springs. The deflectable ends of each pair are indirectly connectable to the free end of the optical fiber to the positioned. The pairs of deflector elements are arranged with respect to one another in such a manner that they move the optical fiber in three mutually perpendicular directions (x, y, z).

In a preferred embodiment according to the invention, the ends of the three pairs of deflector elements are located in retaining blocks. Each pair of deflector elements has one retaining block as a local fixed point and displaces the opposite retaining block. The displaceable retaining block of the first pair of deflector elements forms the fixed point of the second pair of deflector elements. The displaceable retaining block of the second pair of deflector elements forms the fixed point of the third pair of deflector elements. The third pair of the deflector elements displaces a fourth retaining block which performs a displacement in three mutually perpendicular directions (x, y, z).

Such an arrangement of deflector elements offers the advantage that an optical fiber connected to the fourth retaining block can be displaced in three mutually perpendicular directions in a particularly simple and reliable manner without angular errors.

In a further preferred embodiment according to the invention, the main surfaces of the electro-mechanical deflector elements are provided with electrodes which are interrupted at the center of the surfaces. Each electrode is electrically connected to an electrode on the opposite surface, offset from the electrode.

This offers the advantage that the individual deflector elements of the pairs of deflector elements produce a linear movement without any mechanical stress.

In another preferred embodiment according to the invention, three position detectors are provided for determining the instantaneous position of the three pairs of deflector elements. This offers the advantage that the relative position of the optical fiber to be positioned with respect to the locally fixed reference plane can be continuously detected.

In a further preferred embodiment according to the invention, the end of the optical fiber and the reference plane are optically interconnected by means of an elastic coupling element which is filled with a medium having a refractive index which is similar to that of the optical fiber to be positioned. This offers the advantage that, for example for the variable coupling of optical fibers it is not absolutely necessary for the end faces of the optical fibers to satisfy very severe requirements as regards parallelism and surface roughness. The problem of preparing the end faces is substantially reduced by selecting an intermediate medium whose refractive index is adapted to the fibers to be variably coupled.

The advantages obtained by the invention are low manufacturing costs and simplicity of construction of an x-y-z linear adjuster. Because the positioning of an optical fiber with respect to a reference plane (for example a second optical fiber, a light source or a detector) is performed by deflector elements consisting of a piezoelectric (for example electrostrictive) material in a parallel arrangement, the fiber can be positioned without angular errors and without play or friction, thus allowing for adjustments of a few millimeters, depending on the distance and the arrangement of the three pairs of deflector elements with respect to each other. As result of the absence of mechanical guides and other elements which are subject to wear, precise guiding and a long service life are achieved.

DESCRIPTION OF THE PREFERRED EMBODIMENTS

Figure 1:
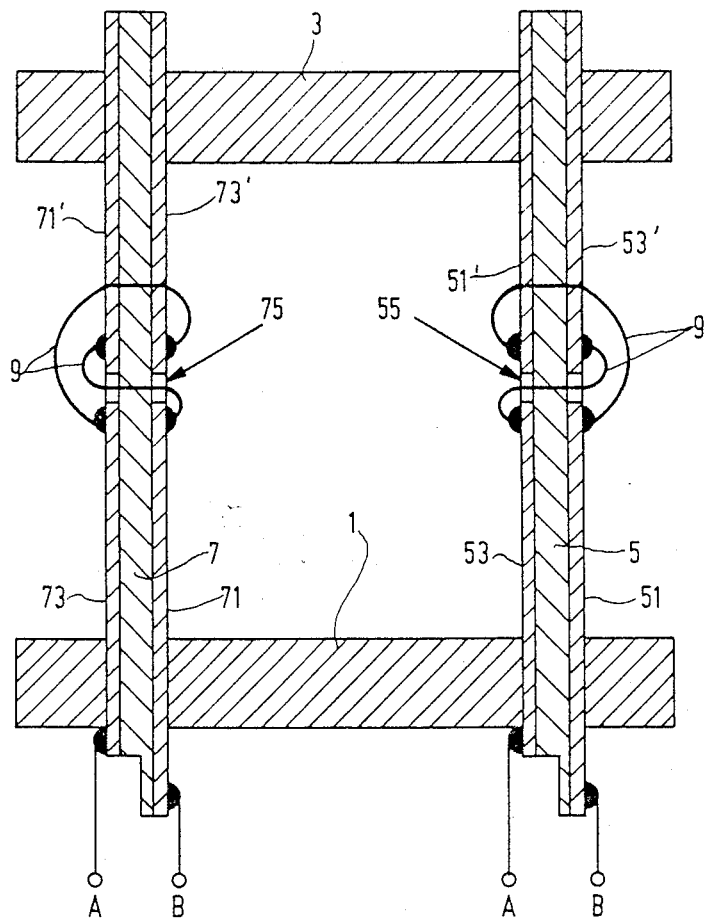
FIG. 1 shows the operating principle of a parallel arrangement of two electro-mechanical deflector elements (pair of detector elements) according to the invention.

FIG. 1 illustrates how a component is displaced without angular errors in one direction, for example the x direction, by a pair of deflector elements, that is to say two parallel deflector elements. Two bilaminar ceramic deflector elements 5 and 7 which form a pair of deflector elements are located in two opposite retaining blocks 1 and 3 (see FIG. 1). The retaining block 1 is stationary (i.e. secured in position), and the retaining block 3 is movable via the deflector elements 5 and 7.

The retaining block 3 is moved along the x-axis by application of a suitable electric voltage of suitable polarity to the terminals A and B. The electric voltage acts on electrodes 51, 53, 51', 53', 71, 73, 71', and 73' which are provided on both sides of the deflector elements 5 and 7. The electrodes are interrupted in their central zone regions 55 and 75 where they are crosswise electrically connected, for example by means of wires 9, so that the electrodes 51 and 51', 53 and 53', 71 and 71' and 73 and 73' are connected respectively.

For an x-y-z linear adjuster three of such pairs of deflector elements are required. The displacement direction x is denoted by arrows for the pair of deflector elements shown in FIG. 1.

Figure 2:
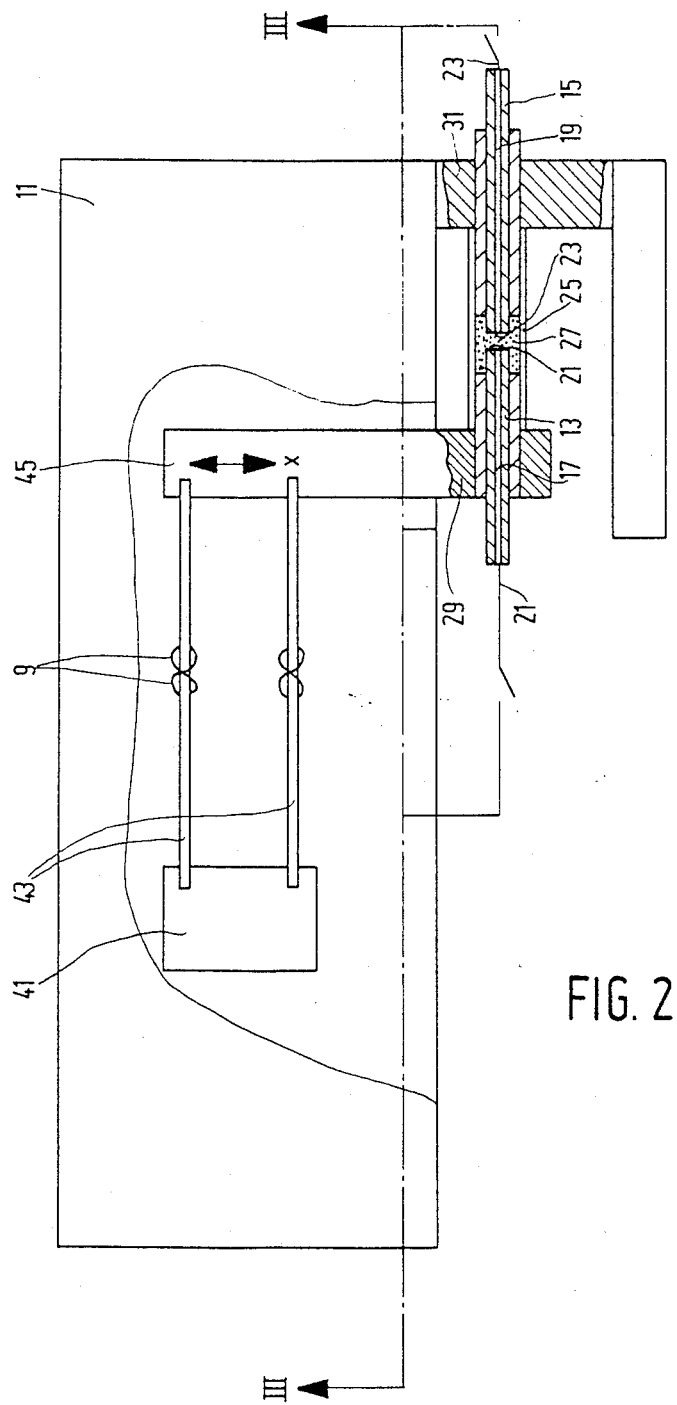
FIG. 2 is a side elevation of a device according to the invention.
Figure 3:
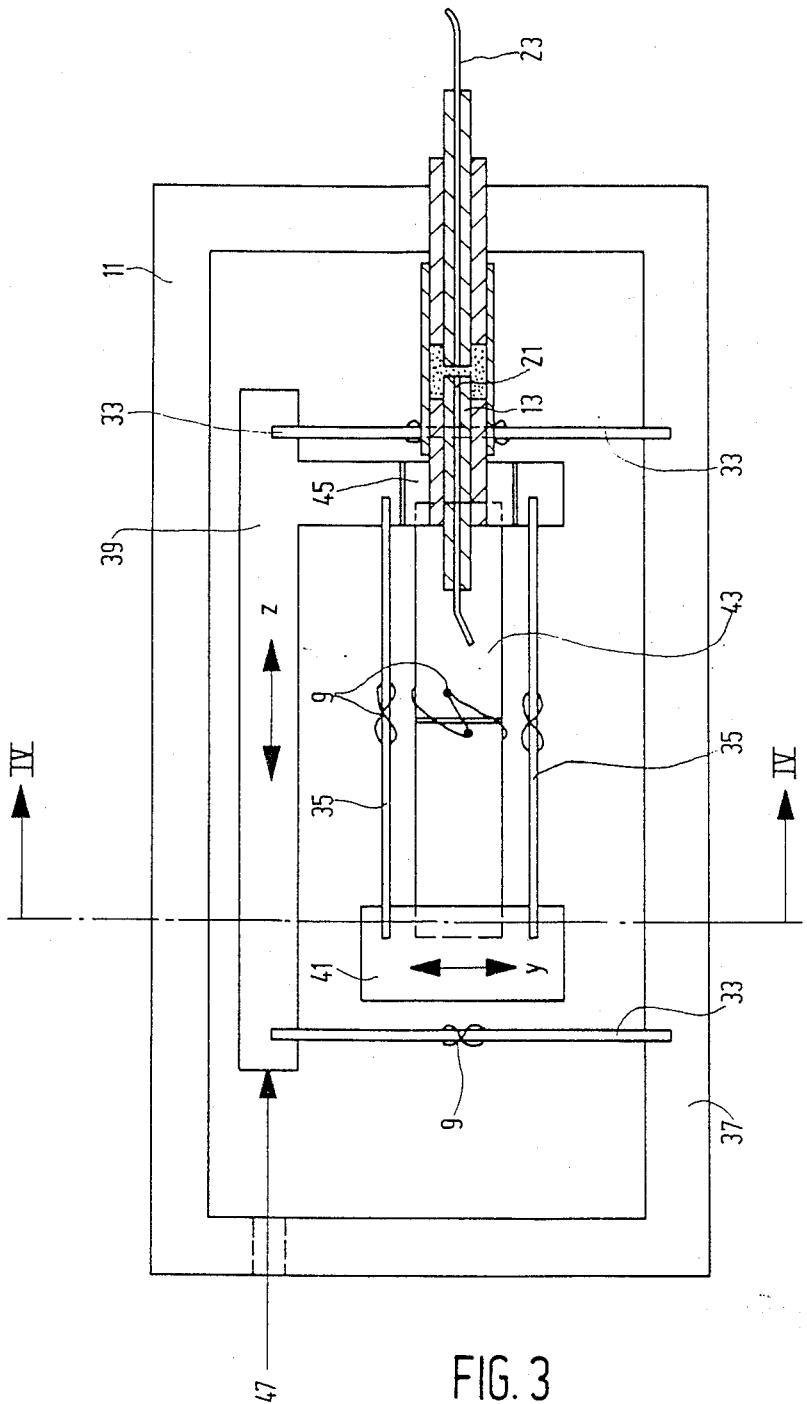
FIG. 3 is a sectional view of a device according to the invention taken along line III—III of FIG. 2.
Figure 4:
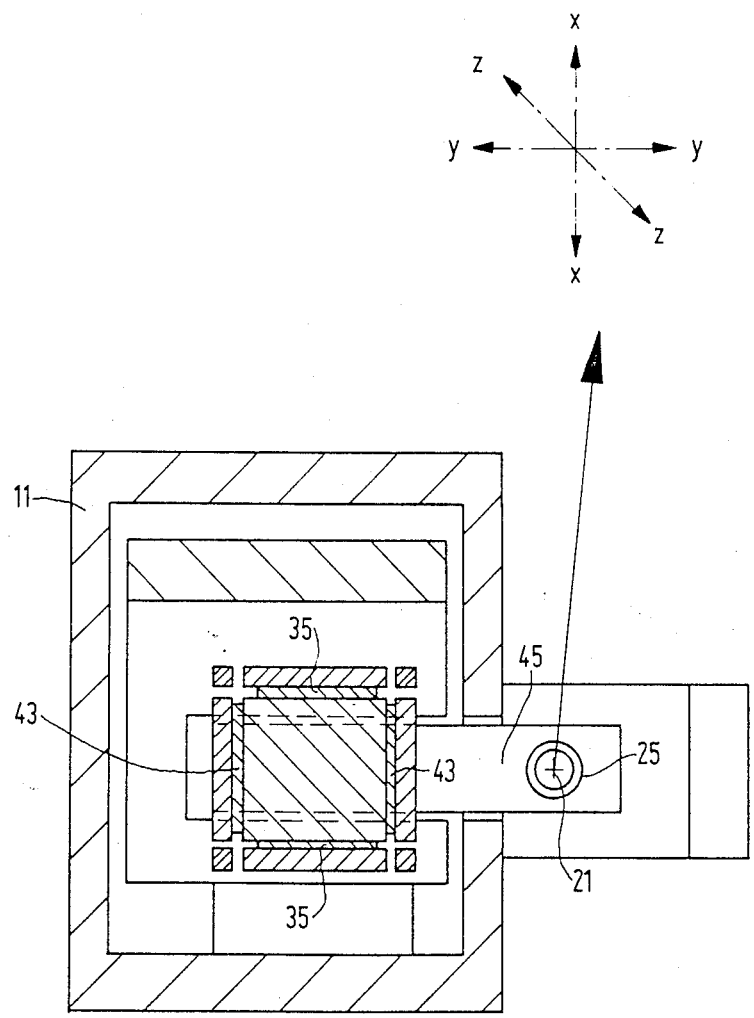
FIG. 4 is a sectional view of a device according to the invention taken along line IV—IV of FIG. 3.

FIGS. 2 to 4 show a side elevation of a device according to the invention and two sectional views (taken along the lines III—III in FIG. 2 and IV—IV in FIG. 3). This device is constructed, for example, so that two optical fibers can be arranged with respect to one another.

FIG. 2 shows the device according to the invention in a side elevation. The device comprises a housing 11 with pins 13 and 15. Pins 13 and 15 are provided with capillary bores 17 and 19 in order to accomodate two optical fibers 21 and 23 to be positioned with respect to one another.

The optical fibers 21 and 23 to be positioned are optically coupled via a flexible sleeve 25 which is filled with a liquid medium 27 at the area of the end faces 21' and 23'. The refractive index of the medium is adapted to that of the optical fibers 21 and 23 to be positioned.

The pins 13 and 15 are removably secured in bores in studs 29 and 31. The sleeve 25 is filled with a medium 27 by removal of one of the two pins 13 or 15. A suitable medium for adaptation of the refractive index is, for example, glycerine.

To one retaining block 41 there is secured a pair of deflector elements 43. A retaining block 45 is displaced by deflector elements 43 in the x-direction after application of a suitable voltage having a suitable polarity.

FIG. 3 is a sectional view of the device shown in FIG. 2 taken along the line III—III. This sectional view shows three pairs of deflector elements 33, 35, and 43 which are required for x-y-z displacement. The locally secured retaining block for the pair of deflector elements 33 is formed by a portion 37 of the housing 11. Upon application of a suitable electric voltage of suitable polarity, the deflector element pair 33 displaces the retaining block 39 in the z-direction. The pair of deflector elements 35 is secured in the retaining block 39 and displaces the retaining block 41 in the y-direction. The pair of deflector elements 43 is secured to the retaining block 41 and displaces the retaining block 45 in the x-direction.

The drawing does not show the voltage source required for activating the deflector elements.

As a result of the mechanical connection of the pin 13 to the movable retaining block 45, the optical fiber 21 inserted in the pin 13 can be displaced with respect to the optical fiber 23 secured in the housing 11 when a suitable electric voltage is applied to the deflector elements of each of pair of deflector elements 33, 35, 43.

The reference numeral 9 denotes the cross-wise wiring of the electrodes of the deflector elements constituting the pairs of deflector elements 33, 35 and 43 (see also the example shown in FIG. 1).

The reference numeral 47 denotes a position detector which detects the movement of the pair of deflector elements 33. The position detector 47 is permanently connected to the housing 11 and measures the displacement of the retaining block 39 by the pair of deflector elements 33. For measuring the displacement of the retaining blocks 41 and 45 by the pairs of deflector elements 33, 35 and 43, there are provided other position detectors which, however, are not shown in the drawing.

FIG. 4 is a sectional view of the device shown in FIG. 3 taken along the line IV—IV. The reference numerals used in FIG. 4 correspond to those used in FIG. 3.

For accuracy it is advantageous to determine the position of the described x-y-z linear adjuster by means of three position detectors. The output signal of the position detectors can be used as a reference value for a position control circuit. This eliminates any fluctuations in the supply voltages for the deflector elements or hysteresis effects. The desired position of the linear adjuster thus need merely be input as a reference value in the control circuit. Preferably an analog controller or a digital control circuit utilizing a digital computer is used.

The electrical deflector elements in the described embodiment are bilaminar ceramic deflector elements. Such deflector elements may consist of, for example piezoelectric ceramic (for example based on lead/alkaline-earth metal titanate/zirconate). Deflector elements made of an electrostrictive material can also be used within the scope of the invention.

The elastic sleeve 25 is preferably made of rubber-elastic materials.

The described device can be advantageously used, for example for determining the mode field width of monomode optical fibers using the so-called variable coupling method. The described device can also be used, for example for positioning and adjusting other components of low weight.

What is claimed is:

1. A device for positioning an end of an optical fiber with respect to a reference plane, said device comprising:
    a housing having a reference plane;
    a first pair of electromechanical deflector elements, said deflector elements being arranged parallel to each other, said deflector elements being deflected in a first direction when an electrical signal is applied thereto, said deflector elements having first and second oppositie ends, the first ends being connected to the end of the optical fiber, the second ends being connected to the housing;

a second pair of electromechanical deflector elements, said deflector elements being arranged parallel to each other, said deflector elements being deflected in a second direction perpendicular to the first direction when an electrical signal is applied thereto, said deflector elements having first and second opposite ends, the first ends being connected to the end of the optical fiber, the second ends being connected to the housing; and a third pair of electromechanical deflector elements, said deflector elements being arranged parallel to each other, said deflector elements being deflected in a third direction perpendicular to the first and second directions when an electrical signal is applied thereto, said deflector elements having first and second opposite ends, the first ends being connected to the end of the optical fiber, the second ends being connected to the housing.

2. A device as claimed in claim 1, characterized in that:

the first ends are indirectly connected to the fiber end; and the second ends are indirectly connected to the housing.

3. A device as claimed in claim 1, further comprising:

a first retaining block accommodating the first ends of the first pair of electromechanical deflector elements and the second ends of the second pair of electromechanical deflector elements; and a second retaining block accommodating the first ends of the second pair of electromechanical deflector elements and the second ends of the third pair of electromechanical deflector elements.

4. A device as claimed in claim 3, characterized in that each deflector element is made of a piezoelectric material.

5. A device as claimed in claim 4, characterized in that each deflector element is a bilaminar ceramic.

6. A device as claimed in claim 4, characterized in that each deflector element is made of an electrostrictive material.

7. A device as claimed in claim 1, characterized in that each deflector element comprises:

a plate with first and second opposite surfaces;

first and second electrodes of substantially equal areas on the first surface of the plate;

third and fourth electrodes of substantially equal areas on the second surface of the plate, said third electrode being arranged substantially opposite the first electrode, said fourth electrode being arranged substantially opposite the second electrode;

means for electrically connecting the first and fourth electrodes to each other; and means for electrically connecting the second and third electrodes to each other.

8. A device as claimed in claim 1, further comprising first, second, and third position detectors, the first detector sensing the positions of the first ends of the first electromechanical deflector elements, the second detector sensing the positions of the first ends of the second electromechanical deflector elements, and the third detector sensing the positions of the first ends of the third electromechanical deflector elements.

9. A device as claimed in claim 1, further comprising:

a first retaining block accommodating the first ends of the first pair of electromechanical deflector elements and the second ends of the second pair of electromechanical deflector elements;

a second retaining block accommodating the first ends of the second pair of electromechanical deflector elements and the second ends of the third pair of electromechanical deflector elements; and a third retaining block accommodating the first ends of the third pair of electromechanical deflector elements and the end of the fiber.

10. A device as claimed in claim 9, characterized in that:

the device further comprises a second optical fiber attached to the housing, said fiber having an end face; and the reference plane is the end face of the second optical fiber.

11. A device as claimed in claim 10, further comprising:

a first pin removably secured to the third retaining block, said first pin having a bore for accommodating the end of the first optical fiber; and a second pin removably secured to the housing, said second pin having a bore for accommodating the end of the second optical fiber.

12. A device as claimed in claim 1:

characterized in that the fiber has a refractive index; and further comprising an elastic coupling element for optically coupling the end of the fiber to the reference plane, said coupling element containing a medium having a refractive index similar to the refractive index of the optical fiber.

13. A device as claimed in claim 12, characterized in that the elastic coupling element comprises an elastic sleeve.

14. A device for positioning an end of an optical fiber with respect to a reference plane, said device comprising:

a housing having a reference plane; and a first pair of electromechanical deflector elements, said deflector elements being arranged parallel to each other, said deflector elements being deflected in a first direction when an electrical signal is applied thereto, said deflector elements having first and second opposite ends, the first ends being connected to the end of the optical fiber, the second ends being connected to the housing;

characterized in that each deflector element comprises:

a plate with first and second opposite surfaces;

first and second electrodes of substantially equal areas on the first surface of the plate;

third and fourth electrodes of substantially equal areas on the second surface of the plate, said third electrode being arranged substantially opposite the first electrode, said fourth electrode being arranged substantially opposite the second electrode;

means for electrically connecting the first and fourth electrodes to each other; and means for electrically connecting the second and third electrodes to each other.

15. A device as claimed in claim 14, further comprising:

a second pair of electromechanical deflector elements, said deflector elements being arranged parallel to each other, said deflector elements being deflected in a second direction perpendicular to the first direction when an electrical signal is applied thereto, said deflector elements having first and second opposite ends, the first ends being connected to the end of the optical fiber, the second ends being connected to the housing;

a third pair of electromechanical deflector elements, said deflector elements being arranged parallel to each other, said deflector elements being deflected in a third direction perpendicular to the first and second directions when an electrical signal is applied thereto, said deflector elements having first and second opposite ends, the first ends being connected to the end of the optical fiber, the second ends being connected to the housing;

a first retaining block accommodating the first ends of the first pair of electromechanical deflector elements and the second ends of the second pair of electromechanical deflector elements; and a second retaining block accommodating the first ends of the second pair of electromechanical deflector elements and the second ends of the third pair of electromechanical deflector elements.

* * * * *